United States Patent

Schwartzman

[15] 3,705,668

[45] Dec. 5, 1972

[54] DISPENSER WITH DIP TUBE

[72] Inventor: Gilbert Schwartzman, 20 Wilmot Circle, Scarsdale, N.Y. 10583

[22] Filed: Nov. 14, 1969

[21] Appl. No.: 876,705

[52] U.S. Cl. ................... 222/207, 222/496, 222/213
[51] Int. Cl. .............................................. B65d 37/00
[58] Field of Search....... 222/207, 464, 496, 205, 211, 222/212, 213, 518, 24, 206, 136; 239/327; 401/206; 137/540, 541, 542

[56] References Cited

UNITED STATES PATENTS 3,438,554   4/1969   Schwartzman ..................... 222/496
3,506,162   4/1970   Schwartzman ................... 239/327 X
2,761,833   9/1956   Ward ................................ 222/207 X
3,246,807   4/1966   Micallef ............................. 222/207
465,049    12/1891   Puffer ................................ 222/464

Primary Examiner—Robert B. Reeves
Assistant Examiner—James M. Slattery
Attorney—Kenneth S. Goldfarb

[57] ABSTRACT

A dispenser comprising a squeezable container having a normally closed valve for preventing feed back of liquid being dispensed from the container and including means mounting the valve in association with a measuring cup at the top of the container and a dip tube which extends from the top substantially throughout the length of the container.

3 Claims, 3 Drawing Figures

PATENTED DEC 12 1972

3,705,668

INVENTOR.
GILBERT SCHWARTZMAN
BY Kenneth S. Goldfarb
ATTORNEY

DISPENSER WITH DIP TUBE

This invention relates to a dispensing container having means for carefully measuring a predetermined amount of liquid while being provided with means for preventing feed back of the liquid into the container while also assuring a flow only of the liquid into the measuring cup.

Various types of liquid detergents, enzymes, and other chemical agents are now being sold for use in washing machines. It is often desirable for the user to pour a precise amount of liquid into the washing machine. Heretofore there have been provided measuring cups, markings on containers, and the like all of which have proven to be unsatisfactory. The present invention provides means for metering and dispensing these liquids for laundry as well as other materials such as cosmetics and pharmaceuticals and the like in a convenient manner whereupon a precise amount of the liquid may be dispensed and in which excess liquid is prevented from being accidentally lost or spilled.

The concept of this invention features the use of a valve arrangement which will prevent the return of liquid which has already been dispensed even though already dispensed liquid surrounds the opening through which it is being dispensed.

Still further objects and features of this invention reside in the provision of a dispenser adapted to be used in conjunction with a conventional squeeze bottle container or the like which is made of readily available materials, such as synthetic plastics so as to enable wide use and distribution, and in which the metering head can be used in conjunction with numerous refillable bottles of liquid as may be desired.

These, together with the various ancillary objects and features of this invention, which will become apparent as the following description proceeds, are attained by this dispenser with dip tube, a preferred embodiment of which is illustrated in the accompanying drawing, by way of example only, wherein.

Figure 1:
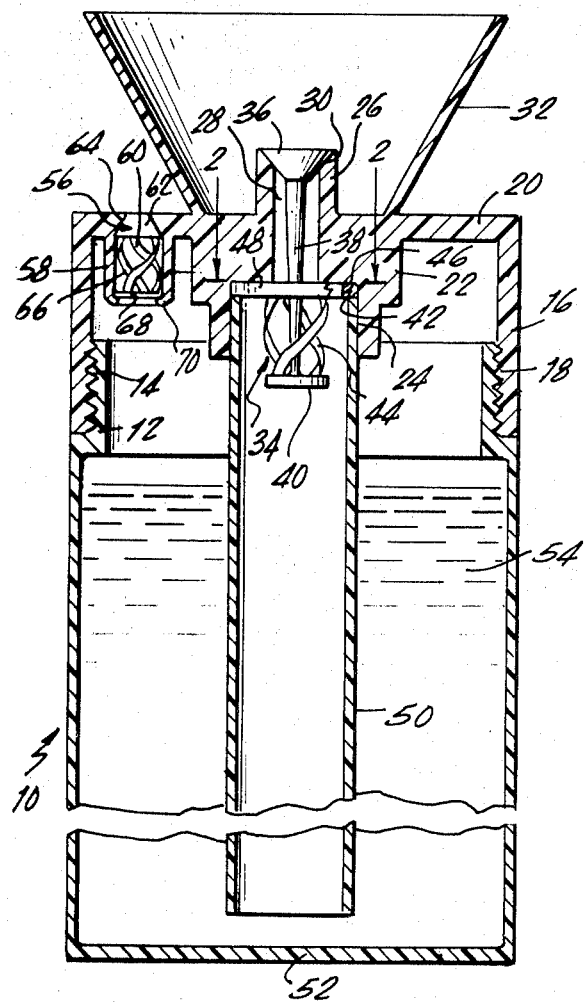
FIG. 1 is a vertical sectional view of a container employing the dispenser comprising the present invention.
Figure 3:
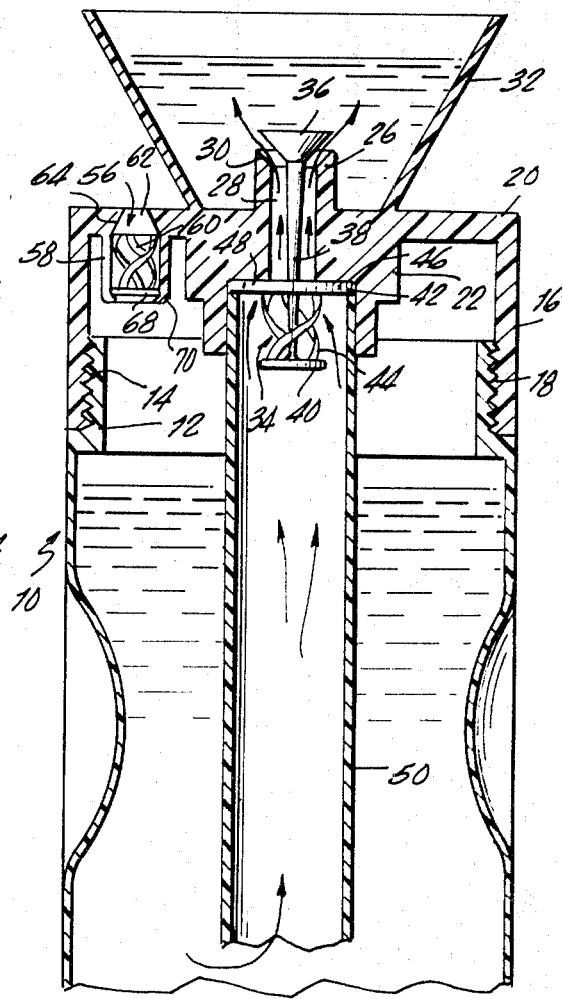
FIG. 3 is a view similar to that of FIG. 1, but showing the manner in which fluid is metered upon squeezing of the container.
Figure 2:
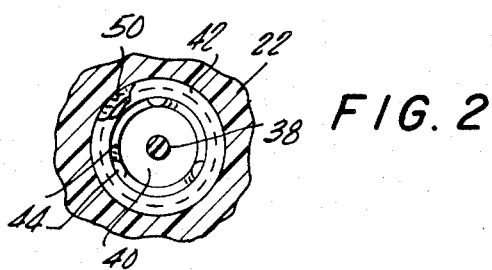
FIG. 2 is a transverse sectional view taken along the plane of line 2—2 in FIG. 1.

With continuing reference to the accompanying drawing, wherein like reference numerals designate similar parts throughout the various views, reference numeral 10 is used to generally designate a squeeze container of conventional type and made of any suitable plastic material, such as polyethylene or the like. The container is provided with a neck portion 12 which is externally threaded as at 14. A cap 16 which is internally threaded at 18 is threadedly removably secured on the neck and includes a top 20. The top 20 has integrally formed therewith a projecting portion 22 which depends downwardly therefrom and is provided with a recess 24 therein. A cylindrical portion 26 extends upwardly from the top 20 as a part of the top 20 and the top 20 has an opening 28 therein which is tapered at the upper portion of the cylindrical portion 26 to form a valve seat 30.

It is within the concept of the present invention that an arrangement eliminating the cylindrical portion 26 be provided and that the opening 28 be tapered and lie flush with the other portions of the top 20.

Integrally formed with the top is a truncated conical measuring cup 32 which surrounds the cylindrical portion 26 and opening 28 and may be provided with any suitable indicia thereon for indicating that filling of the cup 32 to a particular level will equal a certain amount of liquid. The entire cap 16 may be formed of any suitable molded plastic material, and may be transparent or translucent as desired.

Disposed in the opening 28 is an anti-suck back device in the form of a valve assembly generally indicated at 34 and of the type shown in U.S. Pat. No. 3,438,554 of Gilbert Schwartzman, issued Apr. 15, 1969 for "Anti-Suck Back Device for Tubes." This valve assembly includes a valve head 36 of truncated conical shape which is adapted to seat against the valve seat 30 and further includes a stem 38 integral with the valve head and with a base 40. Integrally connecting the valve head 36 with a ring 42 are a plurality of helical coils 44 which extend between the base 40 and the ring and are normally under compression so as to draw the valve head 36 downwardly against the valve seat 30. The ring bears against a shoulder 46 defined by the recess 24 and fluid can pass through the opening 48 in the center of the ring.

A dip tube 50 has its upper end press fitted within the recess and bears against the ring 42 firmly holding the ring in position. The dip tube extends adjacent the bottom 52 of the container 10 which is filled with the liquid 54 to be dispensed. The dip tube prevents air from being bubbled through already dispensed liquid as the container is squeezed and assures full functioning of the measuring and dispensing arrangement for substantially the entire contents of the container.

Venting means 56 is provided and includes a tubular projection 58 integral with the head and which extends downwardly. A valve assembly 60 is disposed in the tubular projection 58 and includes a cylindrical valve head 62 which cooperates with a valve seat 64 defined by an aperture in the top 20. Helical springs 66 are integral with the valve head 62 and a ring 68. The ring 68 is held in place by the swaged lower end 70 of the tubular portion 58 holding the springs 66 under compression, the springs 66 being integral with the ring 68.

In use, when it is desired to fill the measuring cup 32 to a predetermined level the container 10 is squeezed forcing fluid up the dip tube and thence through the opening 28 into the measuring cup 32. Upon release of the container, the springs 44 will close while the outside pressure will depress the springs 66 to equalize the pressure within the container 10. Of course, only a small amount of fluid need be dispensed to exactly fill the container to a desired level, a light squeeze of the container causing a small amount of liquid to enter the measuring cup 32.

A latitude of modification, substitution and change is intended in the foregoing disclosure and in some instances, some features of the invention will be employed without a corresponding use of other features.

I claim:

1. A dispenser comprising a squeezable container having a top provided with an opening therein for permitting fluid flow therethrough and defining a valve seat, a projecting portion depending from said top, said projection portion having a recess therein communicating with said valve seat, a valve assembly including a valve member disposed in said opening and having a valve head engaging said valve seat for closing said opening, a ring of larger diameter than said opening disposed in said recess, and spring means integrally interconnecting said valve head and said ring and being under compression normally urging said valve head against said valve seat, and an elongated tube seated in said recess and extending substantially the length of said container, and vent valve means in said top, said tube engaging said ring, said tube being press fitted in said recess holding said ring in said recess.

2. A dispenser according to claim 1, wherein said vent valve means includes a tubular projection integral with said top, said top having an aperture therein, and a valve assembly seated in said tubular projection normally closing said opening and selectively permitting air to enter said opening.

3. A dispenser according to claim 1, wherein said top includes an upwardly extending cylindrical portion, said opening extending through said cylindrical portion, and a truncated conical measuring cup rising upwardly from said top, said cup surrounding said cylindrical portion.

* * * * *